(12) United States Patent
Fu

(10) Patent No.: US 10,621,439 B2
(45) Date of Patent: Apr. 14, 2020

(54) METHOD, APPARATUS, AND STORAGE MEDIUM FOR SEARCHING FOR OBJECT USING AUGMENTED REALITY (AR)

(71) Applicant: BEIJING XIAOMI MOBILE SOFTWARE CO., LTD., Beijing (CN)

(72) Inventor: Wenjun Fu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/146,207

(22) Filed: Sep. 28, 2018

(65) Prior Publication Data
US 2019/0163976 A1    May 30, 2019

(51) Int. Cl.
| | |
|---|---|
| *G06K 9/00* | (2006.01) |
| *G06K 9/62* | (2006.01) |
| *G06T 11/60* | (2006.01) |
| *G06F 3/01* | (2006.01) |
| *G06F 3/0481* | (2013.01) |
| *G06F 16/583* | (2019.01) |

(52) U.S. Cl.
CPC .......... *G06K 9/00671* (2013.01); *G06F 3/011* (2013.01); *G06F 3/04812* (2013.01); *G06F 16/5838* (2019.01); *G06K 9/6215* (2013.01); *G06T 11/60* (2013.01)

(58) Field of Classification Search
CPC ............ G06F 16/5838; G06F 16/9537; G06F 3/04815; G06F 3/04842; G06F 3/04845; G06F 16/434; G06F 3/011; G06K 9/6215; G06K 9/00671; G06K 9/00791; G06K 9/00624; G06K 9/00664; G06K 9/6201; G06K 9/4604; G06T 17/30; G06T 19/006; G06T 11/60; G06T 2219/004; G06T 13/40; G09G 2340/12; G09G 2354/00; G09G 5/026; G09G 5/14
USPC .......................... 345/633–634; 707/766, 772
See application file for complete search history.

(56) References Cited

U.S. PATENT DOCUMENTS

| | | | |
|---|---|---|---|
| 10,015,628 B1* | 7/2018 | Heintz ................. | H04W 4/021 |
| 2013/0097197 A1* | 4/2013 | Rincover ........... | G01C 21/3614 |
| | | | 707/766 |
| 2013/0342574 A1* | 12/2013 | Tseng ................. | G01C 21/3611 |
| | | | 345/633 |
| 2014/0043433 A1* | 2/2014 | Scavezze .............. | G06T 19/006 |
| | | | 348/42 |

(Continued)

FOREIGN PATENT DOCUMENTS

WO    2017169400 A1    10/2017

OTHER PUBLICATIONS

EESR of European Patent Application No. 18208977.1, from the European Patent office, dated Mar. 21, 2019, 8 pages.

*Primary Examiner* — Jin Cheng Wang
(74) *Attorney, Agent, or Firm* — Arch & Lake LLP

(57) ABSTRACT

A method, an apparatus, and a storage medium are provided for searching for an object. The method is applied in a terminal device and includes: in response to a searching request with respect to an object to be searched for, acquiring a scene picture for surrounding environment through an image capturing apparatus of the terminal device; detecting whether a suspected object corresponding to the object to be searched for exists in the scene picture; and when a suspected object exists in the scene picture, highlighting the suspected object in an augmented reality (AR) manner.

20 Claims, 12 Drawing Sheets

(56) References Cited

U.S. PATENT DOCUMENTS

| | | |
|---|---|---|
| 2014/0053099 A1 | 2/2014 | Groten |
| 2014/0267012 A1* | 9/2014 | Mullins .................. G06F 3/013 345/156 |
| 2015/0049113 A1* | 2/2015 | Rahman ................ G06T 19/006 345/633 |
| 2015/0317836 A1* | 11/2015 | Beaurepaire ............. G09G 5/14 345/634 |
| 2016/0093106 A1* | 3/2016 | Black ................. G06K 9/00624 345/633 |
| 2018/0341811 A1* | 11/2018 | Bendale .................. G06T 7/593 |
| 2018/0349699 A1* | 12/2018 | O'Connell ......... G06K 9/00671 |
| 2019/0066325 A1 | 2/2019 | Okayama |
| 2019/0244436 A1* | 8/2019 | Stansell ................. G06T 19/20 |

\* cited by examiner

METHOD, APPARATUS, AND STORAGE MEDIUM FOR SEARCHING FOR OBJECT USING AUGMENTED REALITY (AR)

CROSS-REFERENCE TO RELATED APPLICATION

This application is based upon and claims priority to Chinese patent application No. 201711212037.0 filed Nov. 28, 2017, which is incorporated herein by reference in its entirety.

TECHNICAL FIELD

The present disclosure relates to the technical field of computers, and more particularly, to a method, an apparatus and a storage medium for searching for an object using Augmented Reality (AR).

BACKGROUND

In our daily lives, we often cannot find an item, for example, cannot find glasses, a public transportation card and so on. In such cases, we need to look for the item with naked eyes. However, by searching for an item with naked eyes, the item tends to be missed by our eyes, resulting in a prolonged search process.

SUMMARY

In order to overcome the problem existing in the related art, the present application provides a method, an apparatus and a storage medium for searching for an object.

According to a first aspect of the present disclosure, there is provided a method for searching for an object. The method is applied in a terminal device and includes: in response to a searching request with respect to an object to be searched for, acquiring a scene picture for surrounding environment through an image capturing apparatus of the terminal device; detecting whether a suspected object corresponding to the object to be searched for exists in the scene picture; and when a suspected object exists in the scene picture, highlighting the suspected object in an AR manner.

According to a second aspect of the present disclosure, there is provided an apparatus for searching for an object, including: a processor; and a memory for storing instructions executable by the processor. The processor is configured to perform the above method.

According to a third aspect of the present disclosure, there is provided a non-transitory computer-readable storage medium having stored therein instructions that, when executed by a processor, cause the processor to perform the method for searching for an object.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
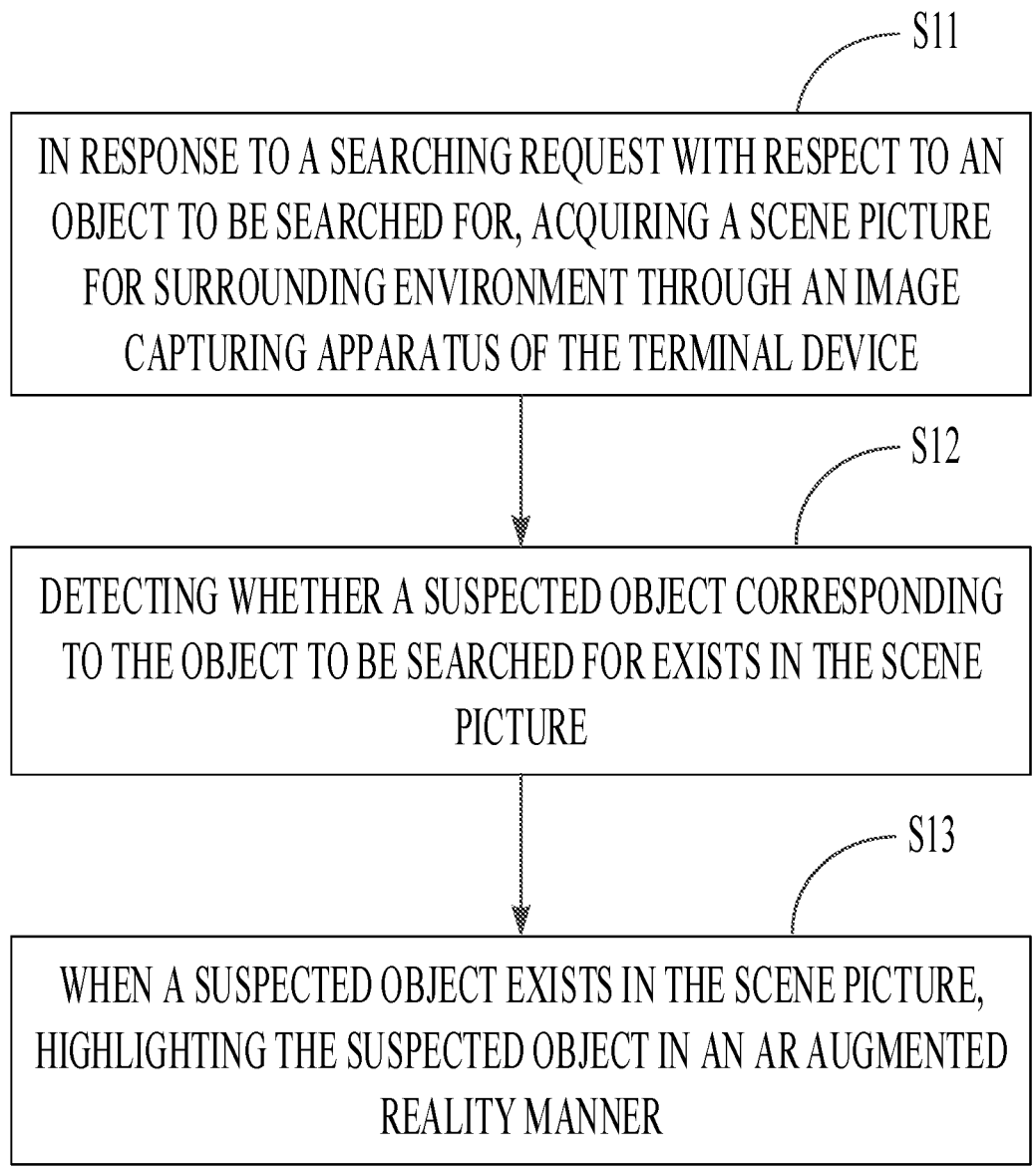
FIG. 1 is a flowchart illustrating a method for searching for an object according to an aspect of the disclosure.

FIG. 1 is a flowchart illustrating a method for searching for an object according to an aspect of the disclosure. As shown in FIG. 1, the method is used in a terminal device, such as smart glasses, Augmented Reality (AR) glasses, a cell phone, a tablet computer and the like, which is not limited in the present disclosure. The method for searching for an object according to the present disclosure includes the following steps.

In step S11, in response to a searching request with respect to an object to be searched for, a scene picture for surrounding environment is acquired through an image capturing apparatus of the terminal device. The terminal device may acquire the scene picture through an image capturing apparatus disposed in the terminal device itself. Alternatively or additionally, the terminal device may acquire the scene picture through an image capturing apparatus communicating with the terminal device. For example, the image capturing apparatus may be on a smart router, a smart home hub, a smart TV, or other smart devices. The search request may also be sent from the smart device communicating with the terminal device.

In step S12, it is detected whether a suspected object corresponding to the object to be searched for exists in the scene picture. The terminal device may detect whether the suspected object exists by image recognition or other signal processing algorithms.

In step S13, when a suspected object exists in the scene picture, the suspected object is highlighted in an augmented reality (AR) manner. The terminal device may display the suspected object in the scene picture by highlighting the suspected object in the AR manner. Thus, the user may easily find the object in the real world by viewing the suspected object in the AR environment.

According to one or more embodiments of the present disclosure, in response to a searching request with respect to an object to be searched for, it is detected whether a suspected object corresponding to the object to be searched for exists in the scene picture for the surrounding environment which is acquired through an image capturing apparatus of the terminal device; and when a suspected object exists in the scene picture, the suspected object is highlighted in an AR manner. In this way, it can facilitate the user to quickly find the object to be searched for.

For example, the terminal device may receive from a user a searching request with respect to an object to be searched for. In response to the searching request, the terminal device acquires a scene picture for surrounding environment by an image acquiring apparatus of the terminal device, and detects whether a suspected object corresponding to the object to be searched for exists in the scene picture. For example, when a user looks for his/her public transportation card before going out, the user wearing AR glasses may send to the AR glasses a searching request with respect to his/her public transportation card. In response to the searching request with respect to the public transportation card, the AR glasses may acquire a scene picture for the surrounding environment by the image acquiring apparatus (for example, a camera) of the AR glasses and detect whether a suspected object corresponding to the public transportation card exists in the scene picture. For example, the user may send a searching request with respect to his/her public transportation card to the AR glasses; in response to the searching request with respect to the public transportation card, the AR glasses directly enter a searching mode and start the camera apparatus (for example, the camera) to acquire a scene picture for the surrounding environment by the camera, and detect whether a suspected object corresponding to the public transportation card exists in the scene picture.

In a possible implementation, the searching request includes at least one of following requests: a voice request, a text request, and a picture request.

For example, the searching request with respect to an object to be searched for may include a voice request. For example, the user may inform his/her AR glasses of the public transportation card he/she is looking for with a voice. For example, the user may send a voice request "Please help me find the public transportation card" to his/her AR glasses. The searching request with respect to an object to be searched for may include a text request. For example, if the user wants to look for a public transportation card with the help of his/her mobile phone, the user may inform his/her mobile phone of the public transportation card he/she is looking for with a text. For example, the user sends a text request "find the public transportation card" to his/her mobile phone. The searching request may also include a picture request. For example, if the user wants to look for a public transportation card with the help of his/her mobile phone, the user may send a searching request with respect to the public transportation card to his/her mobile phone by sending a picture request. For example, a user may acquire a picture related to the public transportation card from his/her album in the mobile phone or from the network, and send to his/her mobile phone a picture request to search for the public transportation card in the picture, so that the terminal device can easily acquire features of the object to be searched for.

The searching request with respect to an object to be searched for may also be any combination of a voice request, a text request and a picture request. For example, the user may send a text request "find the public transportation card" to his/her mobile phone, and at the same time, vocally inform the mobile phone of some features of the public transportation card to be searched for, as a supplementary searching request. For example, the user may send a voice request "blue, rectangular," and so on, In addition, the user may acquire a picture containing a public transportation card from his/her album in the mobile phone, and send a picture request with respect to the public transportation card to his/her mobile phone. Thus, the voice request, the text request and the picture request together serve as the searching request.

In this way, the form of the request can be diversified, and can satisfy different users' preferences and facilitate users to send searching requests to the terminal device according to their habits. It should be understood by those skilled in the art that the searching request with respect to the object to be searched for may include other forms. For example, the searching request may be in the form of a body gesture. The body gesture may be performed by hands or head and detected by the terminal device using one or more sensors. For example, the user may set corresponding gestures for items that he or she looks for frequently. For example, a hand gesture of drawing a circle corresponds to myopia glasses, a hand gesture of drawing a square corresponds to a public transportation card, etc. When she wants to find the myopia glasses, the user may send to the AR glasses a searching request with respect to the myopia glasses with a gesture of drawing a circle. The form of the searching request with respect to an object to be searched for may be set by the system by default, or may be customized by the user according to the user preference. The present disclosure does not limit the form of the searching request.

In a possible implementation, the content of the searching request includes at least one of following contents: a name, a color, a size, and a shape of the object to be searched for.

For example, the content of the searching request with respect to the object to be searched for by the user may include at least one of following contents: a name, a color, a size, and a shape of the object to be searched for. As mentioned above, in case the user wants his/her mobile phone to help find a public transportation card, the user may send a searching request to his/her mobile phone in a number of ways, for example, by sending to his/her mobile phone a voice request "please help me find the public transportation card." Thus, the content of the searching request includes the name (public transportation card) of the object to be searched for. The user may send to his/her mobile phone a searching request including the color of the object to be searched for. For example, if the color of the public transportation card he/she is looking for is blue, the user may send to his/her mobile phone a searching request "find blue." The mobile phone may, in response to the searching request, detect whether a suspected blue object is in the scene picture for the surrounding environment. When a suspected blue object is detected, the suspected object is highlighted in an AR manner. The user may also send to his/her mobile phone a searching request including the size of the object to be searched for. For example, if the public transportation card he/she is looking for is a small card with a size of 5 cm*3 cm, the user may send to his/her mobile phone "5 cm*3 cm." The mobile phone may, in response to the searching request, detect whether a suspected object with a size of 5 cm*3 cm is in the scene picture for the surrounding environment. When such a suspected object is detected, the suspected object is highlighted in an AR manner. The user may also send to his/her mobile phone a searching request including a shape of the object to be searched for. For example, if the shape of the public transportation card that the user is looking for is a rectangle, the user may send to his/her mobile phone a searching request "rectangle." The mobile phone may, in response to the searching request, detect whether a suspected rectangular object is in the scene picture for the surrounding environment. When a suspected rectangular object is detected, the suspected object is highlighted in an AR manner.

The content of the searching request may also include any combination of the name, color, size, and shape of the object to be searched for. For example, the user may send to his/her mobile phone a searching request "Please help me find the public transportation card; blue, rectangular, 5 cm*3 cm," which includes many features of the object to be searched for.

In this way, the terminal device can acquire more features of the object to be searched for, thereby accelerating the searching speed and facilitating the user to quickly and accurately find the object to be searched for. It should be understood by those skilled in the art that the searching request with respect to the object to be searched for may further include other contents, and the present disclosure does not limit the contents of the searching request.

In a possible implementation, the method further includes the following step.

In response to a searching-mode enabling request, a searching mode is enabled. In the searching mode, the searching request with respect to the object to be searched for is received.

For example, when the user searches for an object to be searched for through a terminal device, the user may need to enable the searching mode of the terminal device. When the searching mode is enabled, the terminal device may be used to help search for the object to be searched for. For example, the user may send to the terminal device a searching-mode enabling request, and the searching-mode enabling request may be of many forms.

For example, the searching-mode enabling request may be a vocal enabling request. For example, the user may send to his/her AR glasses a vocal enabling request "enable the searching mode." The AR glasses, in response to the searching-mode enabling request, enable the searching mode. The user may also send a searching-mode enabling request by triggering a searching-mode enabling control element. For example, the terminal device may have a searching-mode enabling control element presented on a system setting page of the terminal device or on a setting page of corresponding object-searching software. The user may trigger the searching-mode enabling control element to enable or disable the searching mode. The terminal device, in response to the searching-mode enabling request, enables the searching mode. For example, the AR glasses may display a searching-mode enabling control element on a virtual display screen. The user may trigger the searching-mode enabling control element on the virtual display screen with his/her finger, to enable the searching mode. The user may send a searching-mode enabling request with a gesture. For example, it may be set that a searching-mode enabling request is sent in the case of continuously drawing 3 circles in a clockwise direction. Then, the user may send a searching-mode enabling request with a gesture of continuously drawing 3 circles in a clockwise direction. The user may also send a searching-mode enabling request by controlling a physical key on the terminal device. For example, a physical key for enabling or disabling the searching mode may be provided on the frame of the AR glasses. The user may send a searching-mode enabling request by pressing the physical key. The AR glasses, in response to the searching-mode enabling request, enable the searching mode.

It should be understood by those skilled in the art that the searching-mode enabling request may include various forms. The form of the searching-mode enabling request may be set by the system by default, or may be customized by the user according to the user preference, as long as the terminal device can receive and respond to the searching-mode enabling request. The disclosure is not limited in this regard.

In a possible implementation, in the searching mode, a searching request with respect to an object to be searched for is received.

For example, as described above, after the searching mode is enabled in response to the searching-mode enabling request, the terminal device is in the searching mode and may receive a searching request with respect to the object to be searched for. For example, the user may send to his/her AR glasses a searching-mode enabling request "enable the searching mode," and the AR glasses in response to the searching-mode enabling request enable the searching mode. At this time, the AR glasses are in the searching mode. The user may send a voice "public transportation card" to the AR glasses, and the AR glasses in the searching mode may receive the voice request "public transportation card" sent by the user and determine that the user has sent a searching request and the object to be searched for is the public transportation card.

In this way, the user may control the terminal device to enable or disable the searching mode. It should be understood by those skilled in the art that it will suffice as long as the searching mode can be enabled in response to the searching-mode enabling request and a searching request with respect to an object to be searched for can be received in the searching-mode enabling request. The disclosure is not limited in this regard.

In a possible implementation, in response to a searching request with respect to an object to be searched for, the terminal device acquires a scene picture for surrounding environment through an image capturing apparatus of the terminal device, and the terminal device detects whether a suspected object corresponding to the object to be searched for exists in the scene picture.

For example, the terminal device detects whether a suspected object corresponding to the object to be searched for exists in the scene picture. As described above, the terminal device may directly receive and respond to the user's searching request with respect to the object to be searched for. Alternatively or additionally, the terminal device may first receive and respond to the searching-mode enabling request, and after the searching mode is enabled, receive and respond to the user's searching request with respect to the object to be searched for. In response to a searching request with respect to an object to be searched for, the terminal device acquires a scene picture for surrounding environment through an image capturing apparatus of the terminal device, and the terminal device detects whether a suspected object corresponding to the object to be searched for exists in the scene picture. For example, the AR glasses enter a searching mode in response to a request for searching for the public transportation card from the user, and may turn on a camera device (for example, a camera), acquire a scene picture for the surrounding environment through the camera, and start to detect whether a suspected object corresponding to the public transportation card exists in the scene picture. It should be understood by those skilled in the art that acquiring a scene picture for the surrounding environment through an image acquisition apparatus of the terminal device and detecting whether a suspected object corresponding to the object to be searched for exists in the scene picture may be performed with a well-known method in the related art, which is not limited by the present disclosure.

Figure 2:
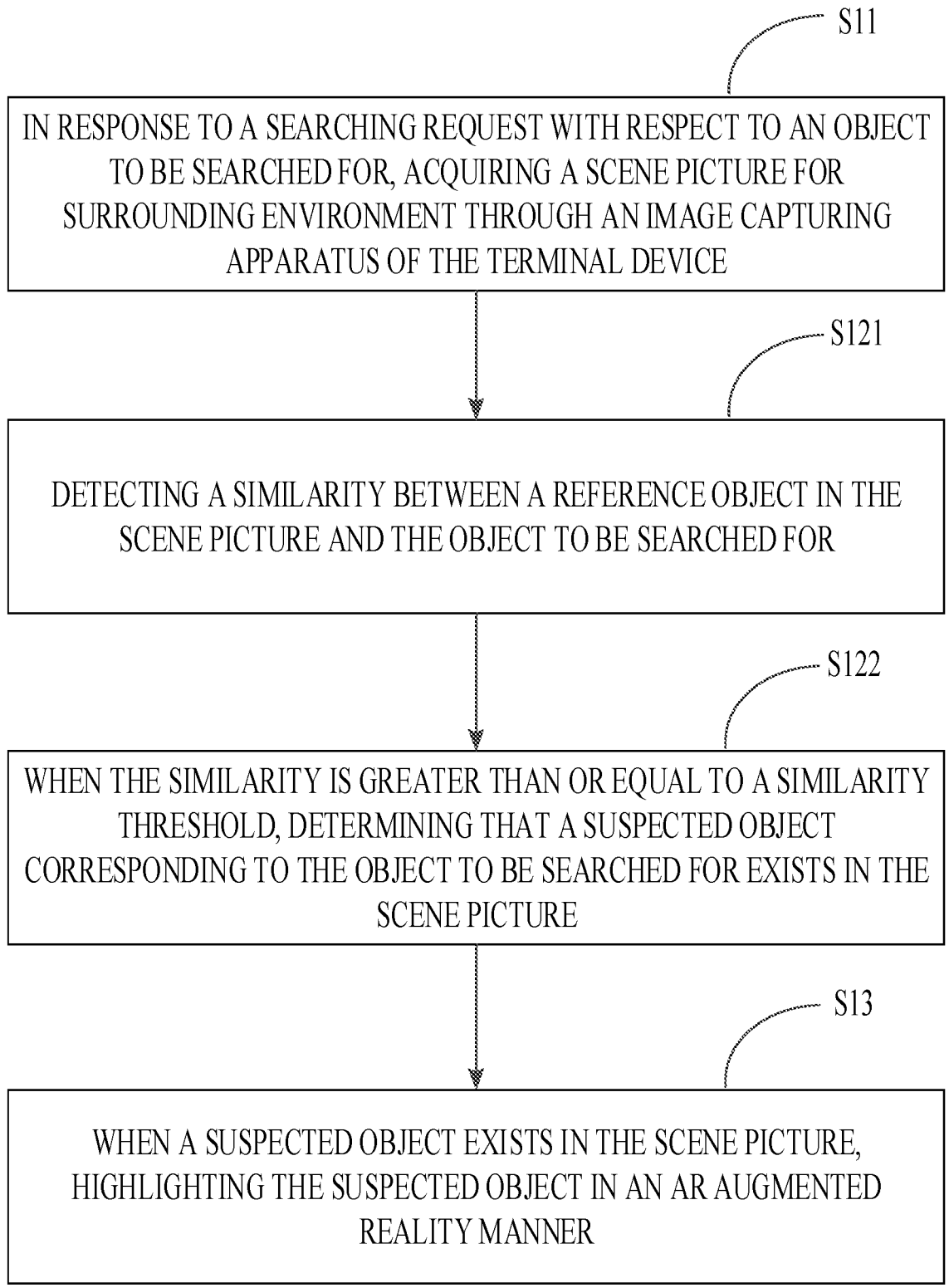
FIG. 2 is a flowchart illustrating a method for searching for an object according to an aspect of the disclosure.

FIG. 2 is a flowchart illustrating a method for searching for an object according to an aspect of the disclosure. In a possible implementation, as shown in FIG. 2, step S12 may include the following steps.

In step S121, a similarity between a reference object in the scene picture and the object to be searched for is detected.

In step S122, when the similarity is greater than or equal to a similarity threshold, it is determined that a suspected object corresponding to the object to be searched for exists in the scene picture.

For example, the terminal device may detect a similarity between a reference object in the scene picture and the object to be searched for, and determine that a suspected object corresponding to the object to be searched for exists in the scene picture when the similarity is greater than or equal to a similarity threshold. For example, in response to the user's searching request with respect to a public transportation card, the AR glasses may enter the searching mode, and turn on the camera, obtain a scene picture for the surrounding environment through the camera, and detect a similarity between a reference object in the scene picture and the public transportation card. Here, the AR glasses may analyze the reference object in the scene picture. The AR glass may perform feature extraction on the reference object in the scene picture, where the similarity between the reference object and the public transportation card may be determined according to features of the reference object and the public transportation card. When it is determined that the obtained similarity is greater than or equal to the similarity threshold, it may be determined that a suspected object (i.e., a reference object with a similarity greater than or equal to the similarity threshold) corresponding to the public transportation card exists in the scene picture.

In a possible implementation, the terminal device may detect that multiple reference objects exist in the scene picture, and each of the similarities between the multiple reference objects and the object to be searched for is greater than or equal to the similarity threshold, and the terminal device may determine that multiple suspected objects corresponding to the object to be searched for exist in the scene picture.

For example, when the AR glasses enter the user's searching mode in response to the searching request with respect to the public transportation card, the AR glasses turn on the camera, capture a scene picture for the surrounding environment through the camera, and detect a similarity between a reference object in the scene picture and the public transportation card. When multiple reference objects exist in the scene picture and each of the similarities between the multiple reference objects and the object to be searched for is greater than or equal to the similarity threshold, it may be determined that multiple suspected objects corresponding to the object to be searched for exist in the scene picture. Here, the scene picture taken by the camera of the AR glasses may include a bank card, a public transportation card and an employee ID card. In case the AR glasses detect that each of the similarities between the three cards and the public transportation card to be searched for is greater than or equal to the similarity threshold, it may be determined that multiple suspected objects corresponding to the object to be searched for exist in the scene picture. Here, to enhance the efficiency of searching, a unique label may be created and affixed to the object beforehand. For example, the user may attach a first QR code to the transportation card and attach a second QR code to the employee card. The QR codes may be generated by the terminal device and then printed out to be attached to objects with similar shapes, for example, books, shoes, etc.

In this way, the similarity between a reference object and the object to be searched for in the scene picture may be detected or calculated using image processing methods. When the similarity is greater than or equal to the similarity threshold, it may be determined that a suspected object corresponding to the object to be searched for exists in the scene picture, thereby facilitating the user to look for the object to be searched for. It should be understood by those skilled in the art that the similarity between the reference object in the scene picture and the object to be searched for may be detected with existing technology. When the similarity is greater than or equal to the similarity threshold, it may be determined that a suspected object corresponding to the object to be searched for exists in the scene picture. The present disclosure does not limit the method for detecting the similarity between the reference object in the scene picture and the object to be searched for, and the value of the similarity threshold.

Figure 3:
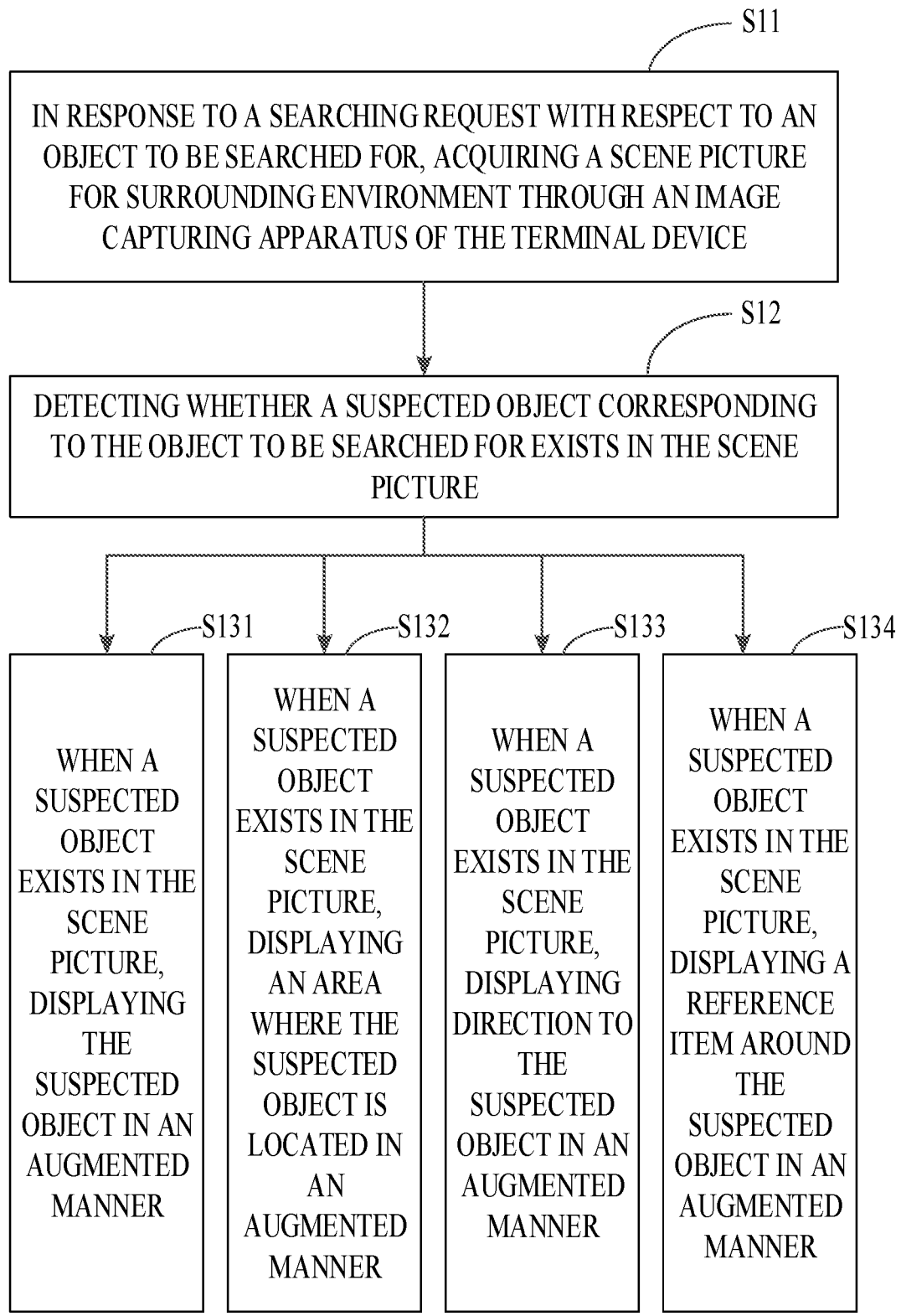
FIG. 3 is a flowchart illustrating a method for searching for an object according to an aspect of the disclosure.

FIG. 3 is a flowchart illustrating a method for searching for an object according to an aspect of the disclosure. In a possible implementation, as shown in FIG. 3, step S13 may include the following steps.

In step S131, when a suspected object exists in the scene picture, the suspected object is displayed in an augmented manner.

In step S132, when a suspected object exists in the scene picture, an area where the suspected object is located is displayed in an augmented manner.

In step S133, when a suspected object exists in the scene picture, a direction to the suspected object is displayed in an augmented manner.

In step S134, when a suspected object exists in the scene picture, a reference item around the suspected object is displayed in an augmented manner, the reference item indicating a location of the suspected object.

For example, when it is detected that a suspected object exists in the scene picture, the suspected object may be prominently marked in an AR manner to inform the user of the location of the object to be searched for and guide the user to find the object to be searched for quickly and accurately.

In a possible implementation, when a suspected object exists in the scene picture, the suspected object may be displayed in an augmented manner.

For example, when a suspected object exists in the scene picture, the suspected object may be displayed in an augmented manner. For example, when the terminal device detects that a suspected object exists in the scene picture, a virtual image may be superimposed on the suspected object in the scene picture captured by the terminal device, or the virtual image may be superimposed on the suspected object in the real scene acquired by the terminal device. The virtual image may include a three-dimensional animation of a mark, where the mark may be any icon selected by the user. Alternatively, the virtual image may include other formats created based on the object to be searched for. For example, when the AR glasses find a suspected public transportation card that the user is looking for, the AR glasses may superimpose a virtual image (for example, a public transportation card with changing colors, an enlarged public transportation card, etc.) on the suspected public transportation card in the scene picture captured by the AR glasses, or may superimpose the virtual image on the suspected public transportation card in the real scene acquired by the AR glasses. With a virtual image different from a real object, the suspected object is displayed in an augmented manner. The suspected object may also be displayed in an augmented manner by filling the object with colors, patterns, etc. For example, when the AR glasses find the suspected public transportation card that the user is looking for, the AR glasses may display the location of the suspected public transportation card in an augmented manner by filling colors, patterns in the suspected public transportation card. It should be understood by those skilled in the art that the suspected object may be displayed in an augmented manner by various means which are not limited to the virtual image, the color, the pattern, and the like, as long as the suspected object may be displayed in an augmented manner when it is detected that the suspected object exists in the scene picture. The present disclosure does not limit this.

Figure 4:
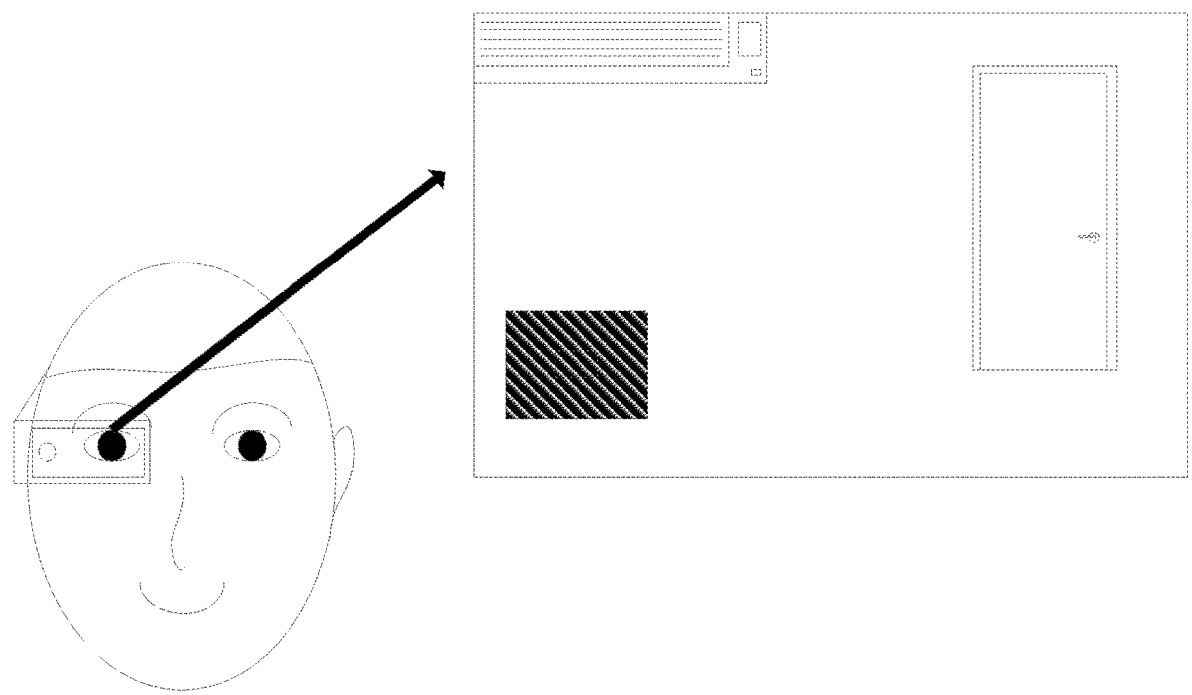
FIG. 4 is a schematic diagram illustrating an application scenario of a method for searching for an object according to an aspect of the disclosure.

FIG. 4 is a schematic diagram illustrating an application scenario of a method for searching for an object according to an aspect of the disclosure. As shown in FIG. 4, the user looks for the public transportation card through the AR glasses he/she is wearing. The user may send a searching request with respect to the public transportation card to his/her AR glasses. The user's AR glasses may capture a scene picture for the surrounding environment through its camera and detect whether a suspected public transportation card corresponding to the public transportation card exists in the scene picture. When the AR glasses detect that a suspected public transportation card exists in the scene picture, the suspected public transportation card may be displayed in an augmented manner. As shown in FIG. 4, the user's AR glasses superimpose a virtual image of the public transportation card (an enlarged public transportation card filled with stripes) on the suspected public transportation card in the real scene to display the suspected public transportation card in an augmented manner.

In a possible implementation, when a suspected object exists in the scene picture, an area where the suspected object is located may be displayed in an augmented manner.

For example, when a suspected object exists in the scene picture, an area where the suspected object is located may be displayed in an augmented manner. For example, when the terminal device detects that a suspected object exists in the scene picture, the terminal device may superimpose a virtual image of the area where the suspected object is located on the area where the suspected object is located in the scene picture captured by the terminal device, or superimpose a virtual image of the area where the suspected object is located on the area where the suspected object located in the real scene acquired by the terminal device, to display the area where the suspected object is located in an augmented manner, thereby facilitating the user to find the suspected object quickly. For example, the AR glasses find the public transportation card that the user is looking for, and the public transportation card is located beside a lamp on a desk. Then, the AR glasses may superimpose a virtual image of the desk and the lamp on the desk and the lamp in the scene picture captured by the AR glasses. It is also possible to perform at least one of the following processes on the area other than the area where the suspected object is located: blurring, turning into gray, darkening and blackening. In this way, it can lower the user's attention to the area other than the area where the suspected object is located while improving the user's attention to the area where the suspected object is located, thereby facilitating the user to find the area where the suspected object is located quickly and accordingly find the suspected object quickly. It should be understood by those skilled in the art that the area where the suspected object is located may be displayed in an augmented manner by various means which are not limited to the above examples, as long as the area where the suspected object is located may be displayed in an augmented manner when it is detected that the suspected object exists in the scene picture. The present disclosure does not limit this.

Figure 5:
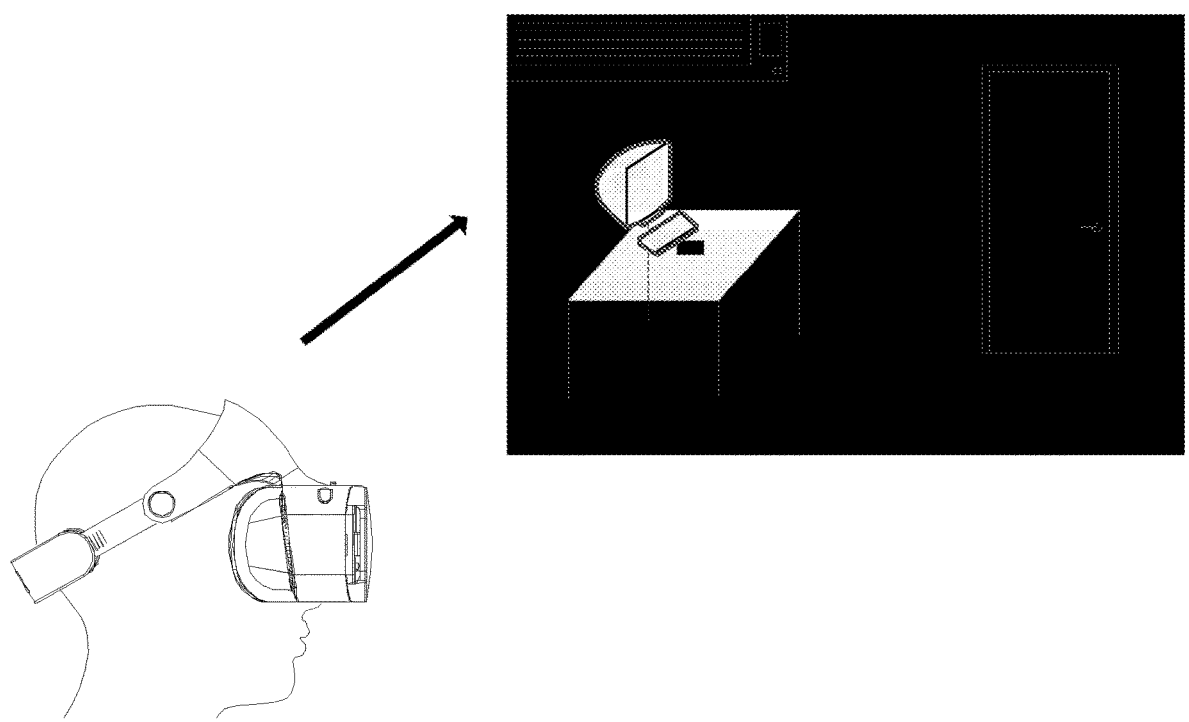
FIG. 5 is a schematic diagram illustrating an application scenario of a method for searching for an object according to an aspect of the disclosure.

FIG. 5 is a schematic diagram illustrating an application scenario of a method for searching for an object according to an aspect of the disclosure. As shown in FIG. 5, the user looks for the public transportation card through the AR glasses he/she is wearing. The user may send a searching request with respect to the public transportation card to his/her AR glasses. The user's AR glasses may capture a scene picture for the surrounding environment through its camera and detect whether a suspected public transportation card corresponding to the public transportation card exists in the scene picture. When the AR glasses detect that a suspected public transportation card exists in the scene picture, the area where the suspected public transportation card is located may be displayed in an augmented manner. For example, as shown in FIG. 5, the user's AR glasses detect that the suspected public transportation card is located beside a lamp on a desk. Then, the AR glasses may blacken the area other than the area where the suspected public transportation card is located, to lower the user's attention to the area other than the area where the suspected public transportation card is located, thereby displaying the area where the suspected object is located in an augmented manner.

In a possible implementation, when a suspected object exists in the scene picture, a direction to the suspected object may be displayed in an augmented manner.

For example, when it is detected that a suspected object exists in the scene picture, the direction to the suspected object may be displayed in an augmented manner. For example, when the terminal device detects that a suspected object exists in the scene picture, the terminal device may display the direction to the suspected object in an augmented manner by means of an arrow or the like. For example, when the AR glasses find a suspected public transportation card that the user is looking for, the AR glasses may superimpose a virtual image of an arrow in the scene picture captured by the AR glasses, pointing to the suspected public transportation card, or superimpose the virtual image of the arrow in a real scene acquired by the terminal device pointing to the suspected public transportation card. In this way, it can facilitate the user to find the suspected object quickly. It should be understood by those skilled in the art that the direction to the suspected object may be displayed in an augmented manner by various means, which are not limited by the present disclosure.

Figure 6:
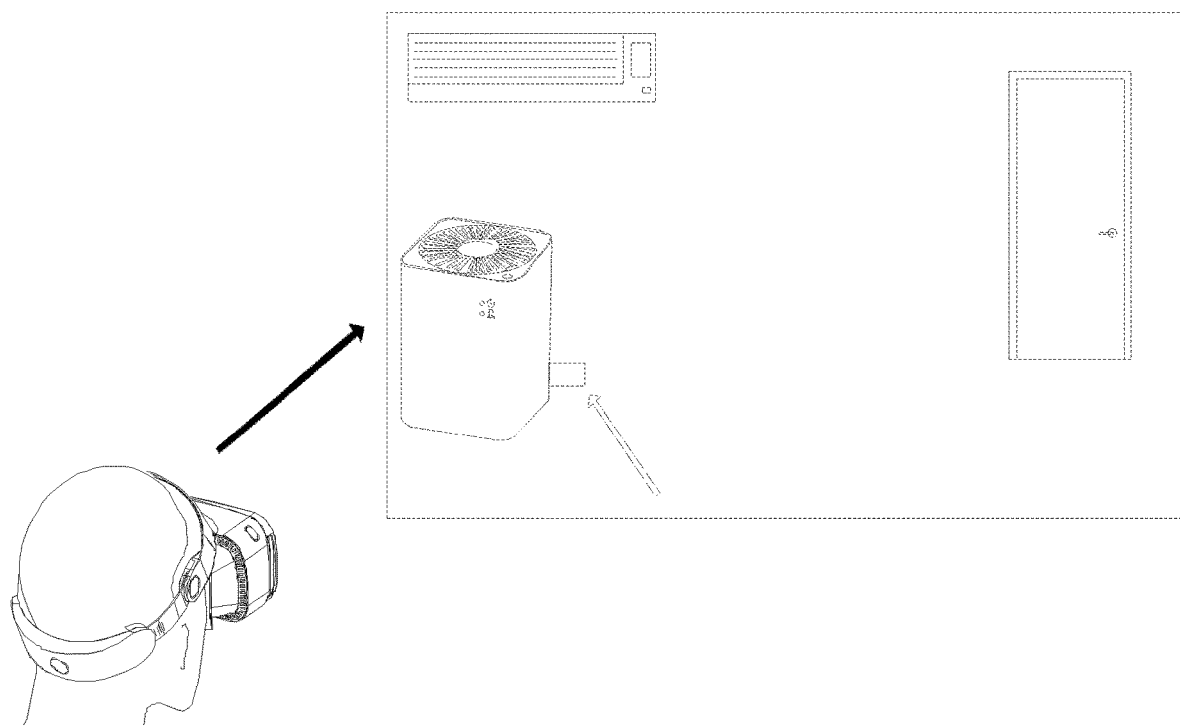
FIG. 6 is a schematic diagram illustrating an application scenario of a method for searching for an object according to an aspect of the disclosure.

FIG. 6 is a schematic diagram illustrating an application scenario of a method for searching for an object according to an aspect of the disclosure. As shown in FIG. 6, the user looks for the public transportation card through the AR glasses he/she is wearing. The user may send a searching request with respect to the public transportation card to his/her AR glasses. The user's AR glasses may capture a scene picture for the surrounding environment through its camera and detect whether a suspected public transportation card corresponding to the public transportation card exists in the scene picture. When the AR glasses detect that a suspected public transportation card exists in the scene picture, the direction to the suspected public transportation card may be displayed in an augmented manner. As shown in FIG. 6, a virtual image of an arrow may be superimposed in the real scene acquired by the AR glasses, pointing to the suspected public transportation card, to display the direction to the suspected public transportation card in an augmented manner.

In a possible implementation, when a suspected object exists in the scene picture, a reference item around the suspected object is displayed in an augmented manner, the reference item indicating the location of the suspected object.

For example, when a suspected object exists in the scene picture, a reference item around the suspected object may be displayed in an augmented manner, the reference item indicating the location of the suspected object. For example, the AR glasses find a suspected public transportation card that the user is looking for, and the suspected public transportation card is located near a refrigerator. Then, the AR glasses may take the refrigerator as the reference item for the suspected public transportation card, and display the refrigerator in an augmented manner (for example, by superimposing a virtual image of a refrigerator on the real refrigerator), to indicate the location of the suspected public transportation card. In this way, the reference item around the suspected object can be used to indicate the location of the suspected object, to facilitate the user to quickly find the object to be searched for. It should be understood by those skilled in the art that reference items around a suspected object may be displayed in an augmented manner with a known method in the related art and that the reference item may take various forms, as long as it can indicate the location of the suspected object, which is not limited by the present disclosure.

Figure 7:
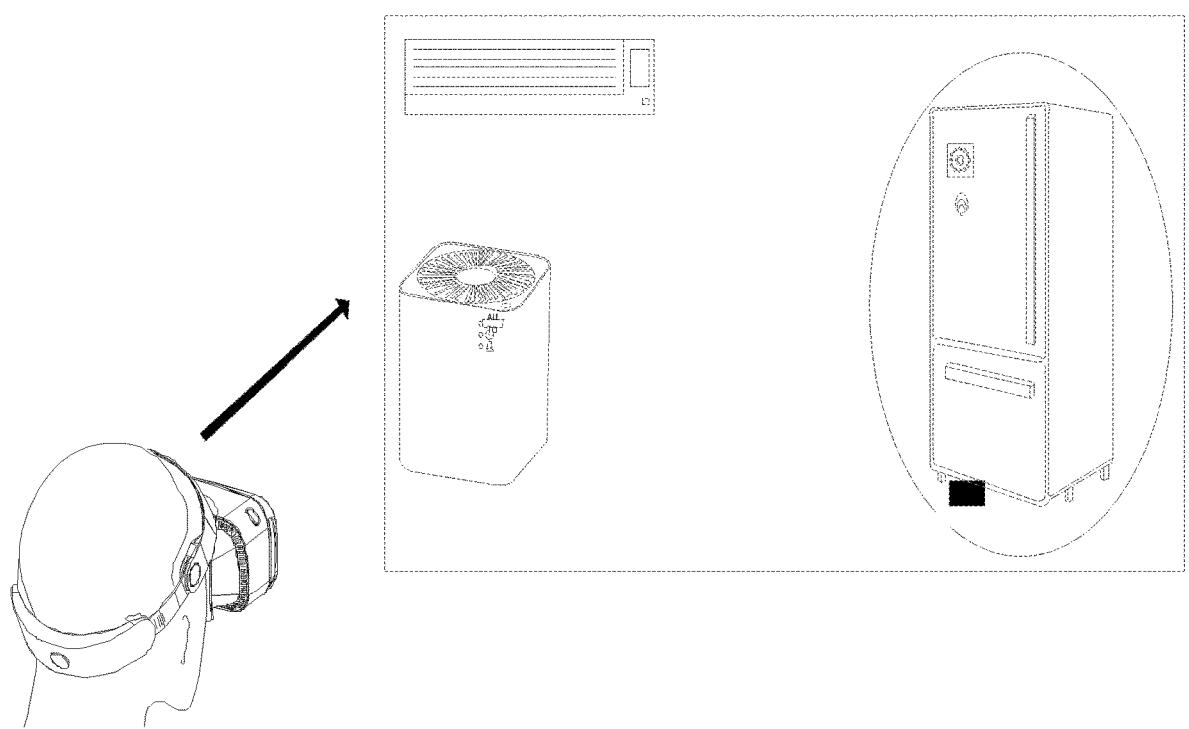
FIG. 7 is a schematic diagram illustrating an application scenario of a method for searching for an object according to an aspect of the disclosure.

FIG. 7 is a schematic diagram illustrating an application scenario of a method for searching for an object according to an aspect of the disclosure. As shown in FIG. 7, the user looks for the public transportation card through the AR glasses he/she is wearing. The user may send a searching request with respect to the public transportation card to his/her AR glasses. The user's AR glasses may capture a scene picture for the surrounding environment through its camera and detect whether a suspected public transportation card corresponding to the public transportation card exists in the scene picture. When the AR glasses detect that a suspected public transportation card exists in the scene picture, the AR glasses may display a reference item around the suspected public transportation card in an augmented manner. For example, a refrigerator around the suspected public transportation card is displayed in an augmented manner. As shown in FIG. 7, a virtual circle may be superimposed on the refrigerator in the real scene acquired by the AR glasses, and the virtual circle encloses the refrigerator to indicate the location of the suspected public transportation card by virtue of the large reference item, i.e. the refrigerator. Here, the virtual circle is just an example, other shapes of virtual shapes may be used to enclose the refrigerator to indicate the location.

It should be understood by those skilled in the art that when the terminal device detects that there is a suspected object in the scene picture, one or more of the suspected object, the area where the suspected object is located, the direction to the suspected object and a reference item around the suspected object may be displayed in an augmented manner with relevant technology, as long as the suspected object is highlighted in an AR manner when the terminal device detects that a suspected object exists in the scene picture.

In a possible implementation, when it is detected that each of the similarities between multiple reference objects and the object to be searched for in the scene picture is greater than or equal to the similarity threshold, it is determined that multiple suspected objects corresponding to the object to be searched for exist in the scene picture, and the suspected objects are highlighted in an AR manner.

For example, as described above, it is detected that each of the similarities between multiple reference objects (for example, a bank card, a public transportation card and an employee ID card) and the public transportation card that the user is looking for is greater than or equal to the similarity threshold. For example, a similarity between a reference object (the bank card) and the public transportation card is 80%, a similarity between another reference object (the public transportation card) and the public transportation card is 95%, a similarity between a further reference object (the employee ID card) and the public transportation card is 70%, and the similarity threshold is 70%. Then, the terminal device may determine that three suspected objects exist in the scene picture, and may highlight the three suspected objects in an AR manner. For example, three virtual images may be respectively superimposed on the three suspected objects in the scene picture to inform the user of the locations of the three suspected objects.

It is also possible to virtually superimpose the information of the similarity between the reference object and the object to be searched for next onto the corresponding suspected object in the scene picture. For example, the value of the corresponding similarity is displayed next to each of the three suspected objects. In this way, the user may determine the order for checking the suspected objects according to values of the similarities, thereby improving the speed and accuracy of finding the object. It should be understood by those skilled in the art that multiple suspected objects may be highlighted in an AR manner by various means. For example, it is also possible to distinguish multiple objects to be searched for by colors, with different colors representing different similarities. The specific correspondence may be set by the system by default, or may be set by the user according to the user preference. For example, the user may set that the object with the highest similarity is displayed in red and the object with the lowest similarity is displayed in green, and so on, which is not limited in the present disclosure.

Figure 8:
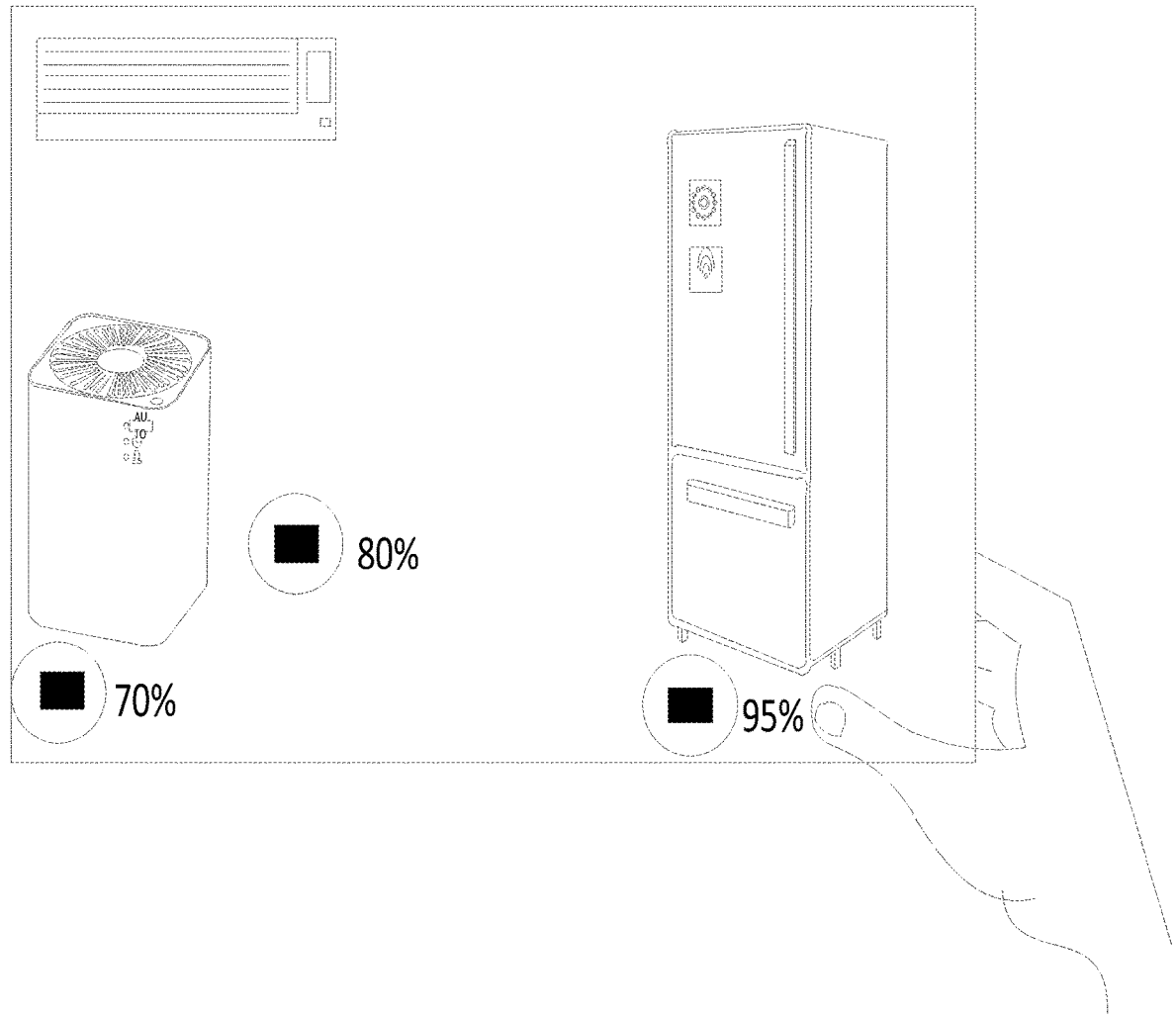
FIG. 8 is a schematic diagram illustrating an application scenario of a method for searching for an object according to an aspect of the disclosure.

FIG. 8 is a schematic diagram illustrating an application scenario of a method for searching for an object according to an aspect of the disclosure. As shown in FIG. 8, the user looks for the public transportation card through his/her mobile phone. The user may send a searching request with respect to the public transportation card to his/her mobile phone. The user's mobile phone may capture a scene picture for the surrounding environment through its camera and detect whether a suspected public transportation card corresponding to the public transportation card exists in the scene picture. When the mobile phone detects that 3 suspected public transportation cards exist in the scene picture, the multiple suspected public transportation cards may be highlighted in an AR manner. As shown in FIG. 8, three virtual circles may enclose the three suspected public transportation cards respectively, and the similarities may be superimposed respectively beside the three suspected public transportation cards, to highlight the multiple suspected public transportation cards.

The following describes an application example according to an embodiment of the present disclosure in order to facilitate understanding of the method for searching for an object, with reference to an exemplary application scenario "looking for a public transportation card with a mobile phone." It should be understood by those skilled in the art that the following application example is only for the purpose of facilitating understanding of the embodiments of the present disclosure and should not be considered as limitations on the embodiments of the present disclosure.

Figure 9:
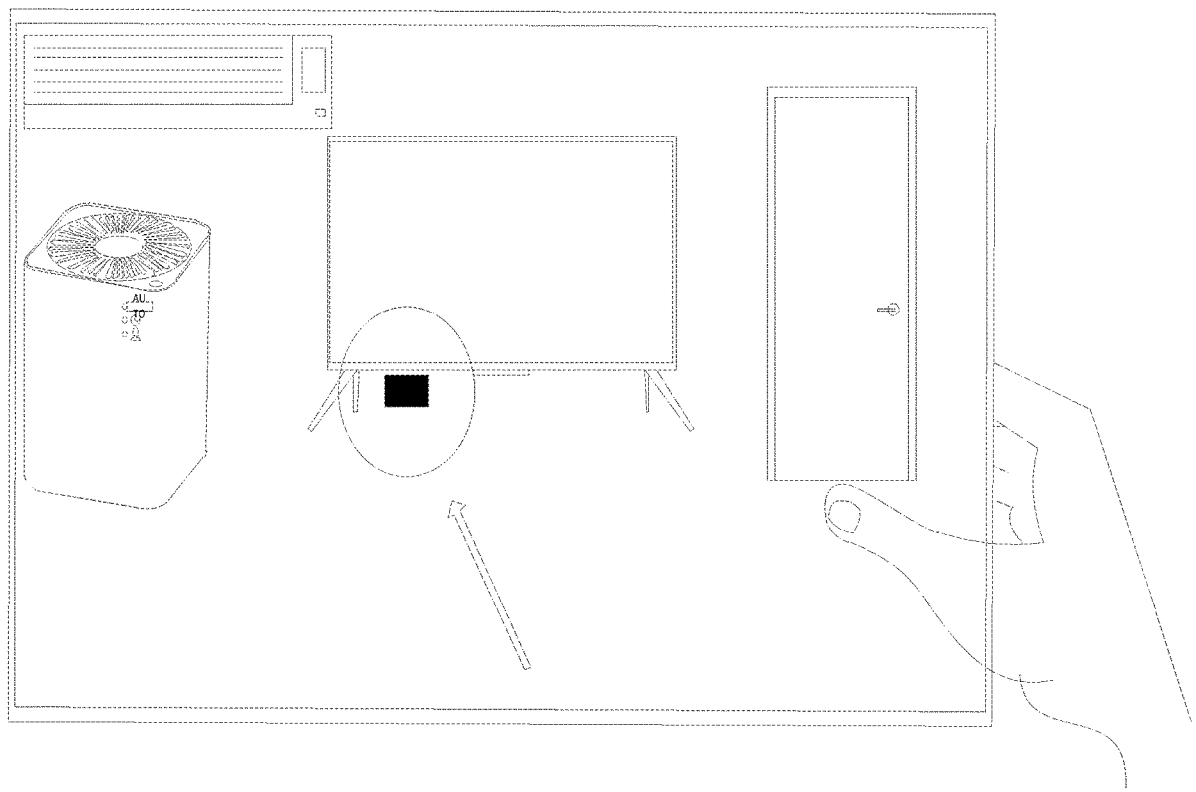
FIG. 9 is a schematic diagram illustrating an application scenario of a method for searching for an object according to an aspect of the disclosure.

FIG. 9 is a schematic diagram illustrating an application scenario of a method for searching for an object according to an aspect of the disclosure. As shown in FIG. 9, in this application example, the setting page of the user's mobile phone includes a searching-mode enabling control element and the user triggers the searching-mode enabling control element when the user's mobile phone is turned on. In this application example, the user sends a voice request to his/her mobile phone. For example, the user says to his/her mobile phone "please help me find the public transportation card."

In this application example, the user's mobile phone turns on the AR camera in response to the searching request of finding the public transportation card, and detects whether a suspected public transportation card corresponding to the public transportation card exists in the scene picture captured by the AR camera of the mobile phone. In this application example, the mobile phone may detect the similarity between a reference object in the scene picture and the public transportation card, and when the similarity is greater than or equal to the similarity threshold, determine that a suspected public transportation card corresponding to the public transportation card exists in the scene picture.

In this application example, when a suspected public transportation card exists in the scene picture, the suspected public transportation card is highlighted in an AR manner. For example, the suspected public transportation card and the direction to the suspected public transportation card are displayed in an augmented manner in the scene picture. For example, the suspected public transportation card is circled with a virtual circle and the direction to the suspected public transportation card is indicated with a virtual arrow.

According to the embodiment of the present disclosure, in response to a searching request with respect to an object to be searched for, it is detected whether a suspected object corresponding to the object to be searched for exists in the scene picture for the surrounding environment which is acquired through an image capturing apparatus of the terminal device, and when a suspected object exists in the scene picture, the suspected object is highlighted in an AR manner. In this way, it can facilitate the user to quickly find the object to be searched for.

Figure 10:
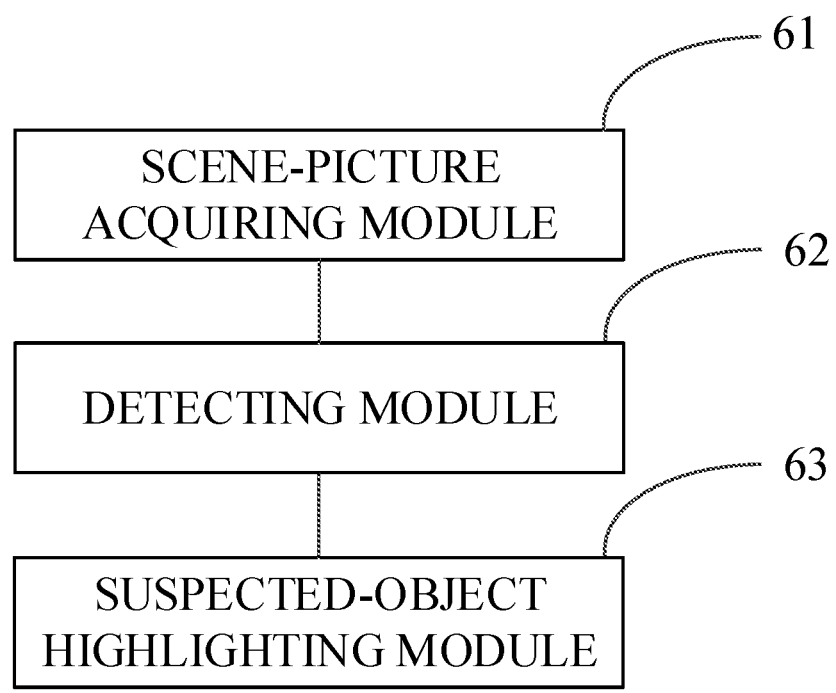
FIG. 10 is a block diagram illustrating an apparatus for searching for an object according to an aspect of the disclosure.

FIG. 10 is a block diagram illustrating an apparatus for searching for an object according to an aspect of the disclosure. Referring to FIG. 10, the device includes a scene-picture acquiring module 61, a detecting module 62 and a suspected-object highlighting module 63.

The scene-picture acquiring module 61 is configured to, in response to a searching request with respect to an object to be searched for, acquire a scene picture for surrounding environment through an image capturing apparatus of the terminal device.

The detecting module 62 is configured to detect whether a suspected object corresponding to the object to be searched for exists in the scene picture.

The suspected-object highlighting module 63 is configured to, when a suspected object exists in the scene picture, highlight the suspected object in an AR manner.

Figure 11:
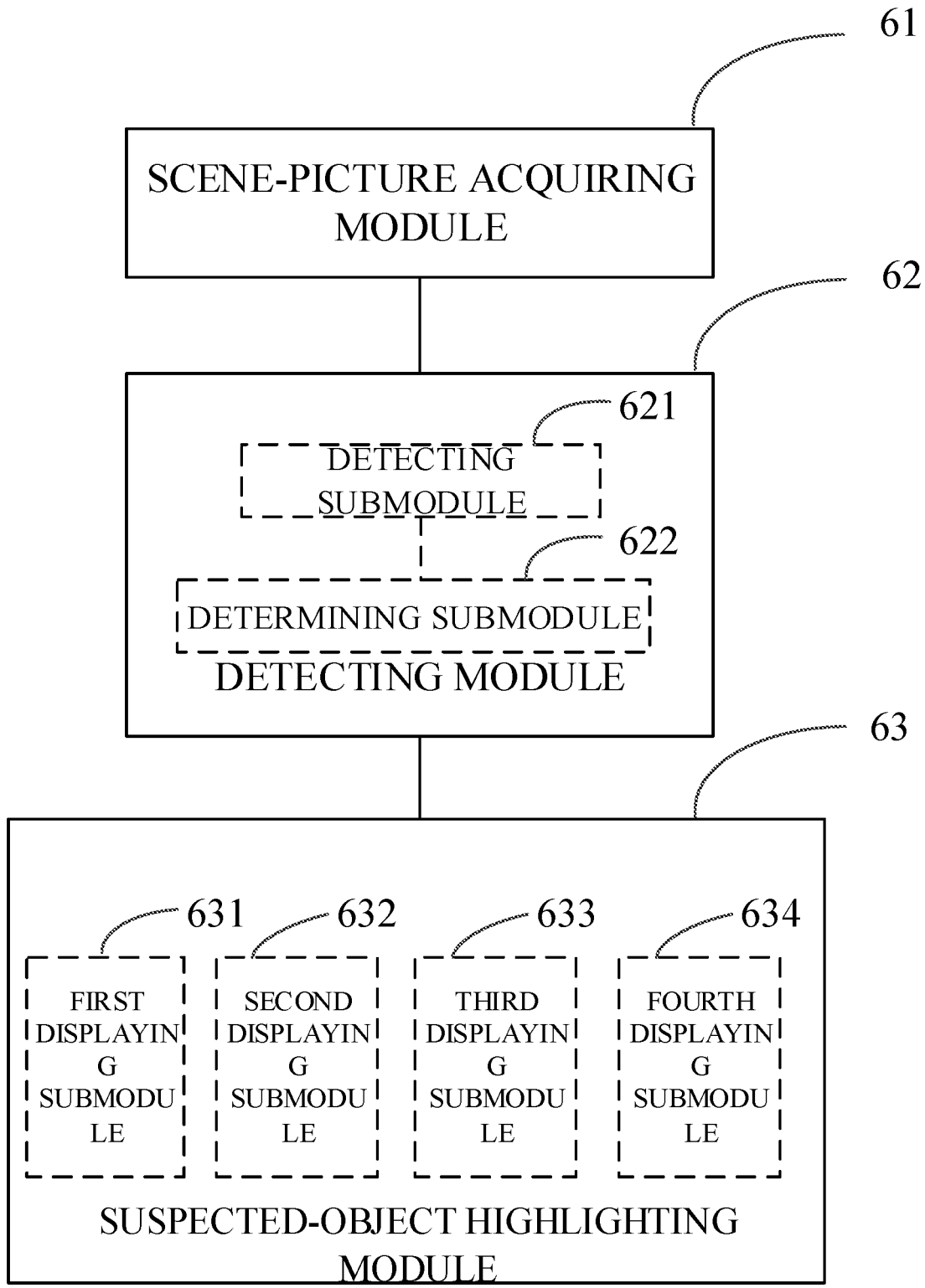
FIG. 11 is a block diagram illustrating an apparatus for searching for an object according to an aspect of the disclosure.

FIG. 11 is a block diagram illustrating an apparatus for searching for an object according to an aspect of the disclosure. Referring to FIG. 11, in a possible implementation, the detecting module 62 includes:

a detecting submodule 621 configured to detect a similarity between a reference object in the scene picture and the object to be searched for; and a determining submodule 622 configured to, when the similarity is greater than or equal to a similarity threshold, determine that a suspected object corresponding to the object to be searched for exists in the scene picture.

Referring to FIG. 11, in a possible implementation, the suspected-object highlighting module 63 includes at least one of the following submodules:

a first displaying submodule 631 configured to, when a suspected object exists in the scene picture, display the suspected object in an augmented manner;

a second displaying submodule 632 configured to, when a suspected object exists in the scene picture, display an area where the suspected object is located in an augmented manner;

a third displaying submodule 633 configured to, when a suspected object exists in the scene picture, display a direction to the suspected object in an augmented manner; and a fourth displaying submodule 634 configured to, when a suspected object exists in the scene picture, display a reference item around the suspected object in an augmented manner, the reference item indicating a location of the suspected object.

In a possible implementation, the searching request includes at least one of a voice request, a text request and a picture request.

In a possible implementation, content of the searching request includes at least one of a name, a color, a size, and a shape of the object to be searched for.

With respect to the apparatus in the foregoing embodiment, a specific manner in which each module performs an operation has been described in detail in the embodiments related to the method, and a detailed description of the apparatus will be omitted herein.

Figure 12:
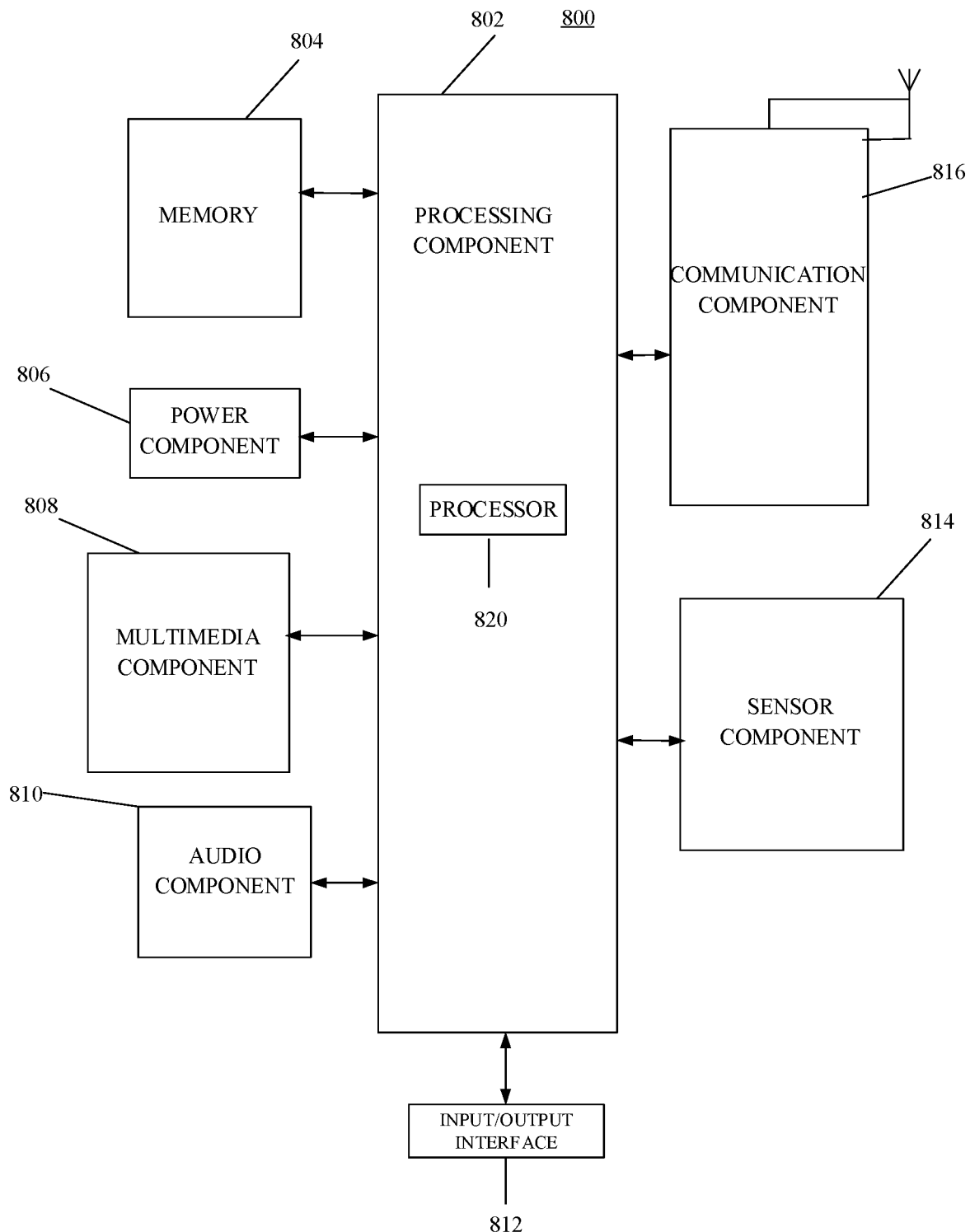
FIG. 12 is a block diagram illustrating an apparatus for searching for an object according to an aspect of the disclosure.

FIG. 12 is a block diagram illustrating an apparatus 800 for searching for an object according to an aspect of the disclosure. For example, the apparatus 800 may be a mobile phone, a computer, a digital broadcast terminal, a messaging device, a gaming console, a tablet, a medical device, exercise equipment, a personal digital assistant, and the like.

Referring to FIG. 12, the apparatus 800 can include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 can include one or more processors 820 to execute instructions to perform all or part of the steps in the above described methods. Moreover, the processing component 802 can include one or more modules which facilitate the interaction between the processing component 802 and other components. For instance, the processing component 802 can include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 can include a power management system, one or more power sources, and any other components associated with the generation, management, and distribution of power in the apparatus 800.

The multimedia component 808 includes a screen providing an output interface between the apparatus 800 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 808 includes a front camera and/or a rear camera. The front camera and/or the rear camera can receive an external multimedia datum while the apparatus 800 is in an operation mode, such as a photographing mode or a video mode. Each of the front camera and the rear camera can be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal can be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons can include, but are not limited to, a home button, a volume button, a starting button, and a locking button.

The sensor component 814 includes one or more sensors to provide status assessments of various aspects of the apparatus 800. For instance, the sensor component 814 can detect an open/closed status of the apparatus 800, relative positioning of components, e.g., the display and the keypad of the apparatus 800. The sensor component 814 can also detect a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 can include a proximity sensor configured to detect the presence of nearby objects without any physical contact. The sensor component 814 can also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In one aspect of the disclosure, the communication component 816 receives a broadcast signal or broadcast associated information from an external broadcast management system via a broadcast channel. In one aspect of the disclosure, the communication component 816 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In aspect of the disclosures, the apparatus 800 can be implemented with one or more circuits including: application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. Each module or submodule may be implemented at least partially using one or more of the above circuits.

In aspect of the disclosures, there is also provided a non-transitory computer-readable storage medium including instructions, such as included in the memory 804, executable by the processor 820 in the apparatus 800, for performing the above-described methods. For example, the non-transitory computer-readable storage medium can be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for searching for an object, the method being applied in a terminal device and comprising:
   in response to a searching request with respect to an object to be searched for, acquiring, by the terminal device, a scene picture for surrounding environment through an image capturing apparatus;
   detecting whether a suspected object corresponding to the object to be searched for exists in the scene picture; and
   when a suspected object exists in the scene picture, highlighting the suspected object and surrounding area in an augmented reality (AR) environment by displaying, in the AR environment, a reference item superimposed with a first virtual content, wherein the reference item is around the suspected object highlighted with a second virtual content, the reference item indicating the position of the suspected object, and wherein the reference item is an item that is originally captured in the scene picture.

2. The method according to claim 1, wherein detecting whether the suspected object corresponding to the object to be searched for exists in the scene picture comprises:
   detecting a similarity between a reference object in the scene picture and the object to be searched for; and
   when the similarity is greater than or equal to a similarity threshold, determining that the suspected object corresponding to the object to be searched for exists in the scene picture.

3. The method according to claim 1, wherein when the suspected object exists in the scene picture, highlighting the suspected object in the AR manner environment further comprises at least one of display effect:
   when a suspected object exists in the scene picture, displaying the suspected object in an augmented manner;
   when a suspected object exists in the scene picture, displaying an area where the suspected object is located in an augmented manner; and
   when a suspected object exists in the scene picture, displaying a direction to the suspected object in an augmented manner.

4. The method according to claim 1, wherein the searching request comprises at least one of following requests: a voice request, a text request, and a picture request.

5. The method according to claim 1, wherein the searching request comprises at least one of following contents: a name, a color, a size, and a shape of the object to be searched for.

6. The method according to claim 1, wherein the image capturing apparatus is disposed on the terminal device, and wherein the reference item indicates an indoor home appliance that is originally captured in the scene picture captured by the image capturing apparatus of the terminal device.

7. The method according to claim 1, wherein the image capturing apparatus is disposed on a smart device that communicates with the terminal device.

8. The method according to claim 7, wherein the smart device comprises at least one of following devices: a smart router, a smart home hub, and a smart TV.

9. An apparatus for searching for an object, comprising:
   a processor; and
   a memory for storing instructions executable by the processor,
   wherein the processor is configured to perform acts comprising:
   in response to a searching request with respect to an object to be searched for, acquiring, by a terminal device, a scene picture for surrounding environment through an image capturing apparatus;
   detecting whether a suspected object corresponding to the object to be searched for exists in the scene picture; and
   when a suspected object exists in the scene picture, highlighting the suspected object and surrounding area in an augmented reality (AR) environment by displaying, in the AR environment, a reference item superimposed with a first virtual content, wherein the reference item is around the suspected object highlighted with a second virtual content, the reference item indicating the position of the suspected object, and wherein the reference item is an item that is originally captured in the scene picture.

10. The apparatus according to claim 9, wherein the processor is configured to further perform acts comprising:
    detecting a similarity between a reference object in the scene picture and the object to be searched for; and
    when the similarity is greater than or equal to a similarity threshold, determining that the suspected object corresponding to the object to be searched for exists in the scene picture.

11. The apparatus according to claim 9, wherein the processor is configured to further perform acts comprising:
    when a suspected object exists in the scene picture, displaying the suspected object in an augmented manner.

12. The apparatus according to claim 9, wherein the processor is configured to further perform acts comprising:
    when a suspected object exists in the scene picture, displaying an area where the suspected object is located in an augmented manner.

13. The apparatus according to claim 9, wherein the processor is configured to further perform acts comprising:
    when a suspected object exists in the scene picture, displaying a direction to the suspected object in an augmented manner.

14. The apparatus according to claim 9, wherein the searching request comprises at least one of following requests: a voice request, a text request, and a picture request.

15. The apparatus according to claim 9, wherein the searching request comprises at least one of following contents: a name, a color, a size, and a shape of the object to be searched for.

16. A non-transitory computer-readable storage medium having stored therein instructions that, when executed by a processor, cause the processor to perform acts comprising:
    in response to a searching request with respect to an object to be searched for, acquiring, by a terminal device, a scene picture for surrounding environment through an image capturing apparatus;
    detecting whether a suspected object corresponding to the object to be searched for exists in the scene picture; and
    when a suspected object exists in the scene picture, highlighting the suspected object and surrounding area in an augmented reality (AR) environment by displaying, in the AR environment, a reference item superimposed with a first virtual content, wherein the reference item is around the suspected object highlighted with a second virtual content, the reference item indicating the position of the suspected object, and wherein the reference item is an item that is originally captured in the scene picture.

17. The storage medium according to claim 16, wherein when executed by the processor, the instructions further cause the processor to perform acts comprising:

detecting a similarity between a reference object in the scene picture and the object to be searched for; and when the similarity is greater than or equal to a similarity threshold, determining that the suspected object corresponding to the object to be searched for exists in the scene picture.

18. The storage medium according to claim 16, wherein when executed by the processor, the instructions further cause the processor to perform acts comprising:

when a suspected object exists in the scene picture, displaying the suspected object in an augmented manner;

when a suspected object exists in the scene picture, displaying an area where the suspected object is located in an augmented manner; and when a suspected object exists in the scene picture, displaying a direction to the suspected object in an augmented manner.

19. The storage medium according to claim 16, wherein the searching request comprises at least one of following requests: a voice request, a text request, and a picture request.

20. The storage medium according to claim 16, wherein the searching request comprises at least one of following contents: a name, a color, a size, and a shape of the object to be searched for.

* * * * *